Patented Jan. 3, 1933

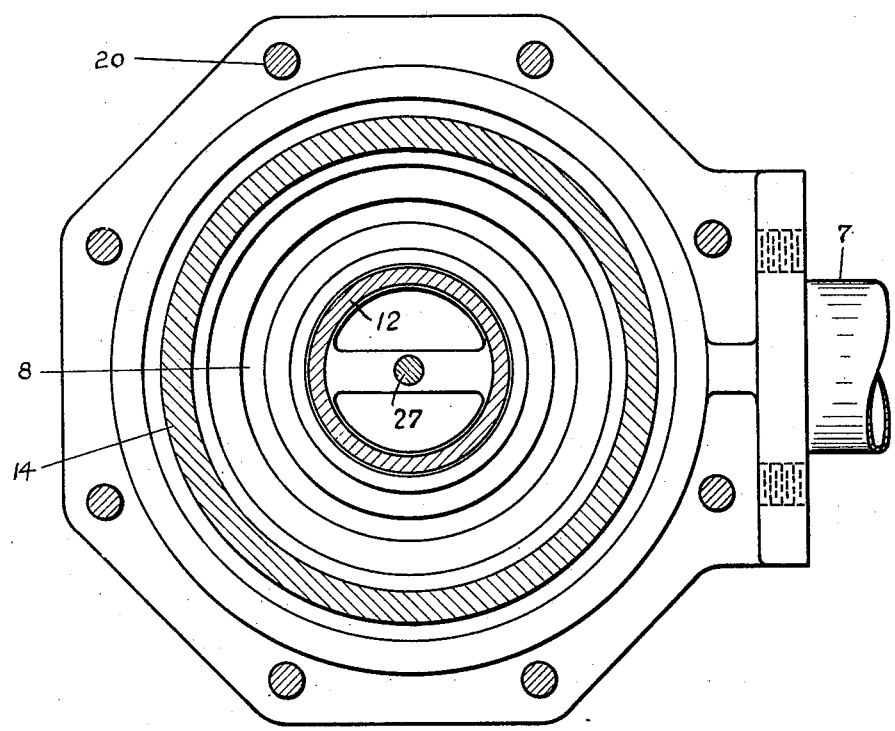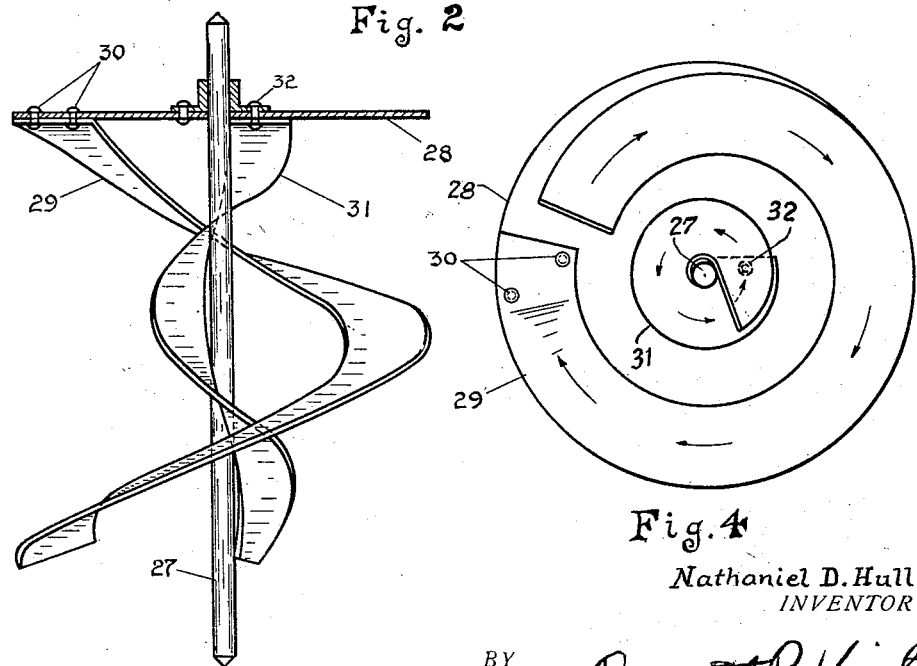

1,893,233

UNITED STATES PATENT OFFICE

NATHANIEL D. HULL, OF LA FAYETTE, INDIANA

LIQUID FLOW INDICATOR

Application filed February 16, 1931. Serial No. 516,003.

My invention relates to a visible flow indicator, particularly adaptable for use on meter type liquid dispensing apparatus.

The advent of the meter type pump was the result of public demand for greater speed and accuracy in the dispensing of gasoline. While the public demanded this service, they additionally sought some visible means of indicating the quality of liquid being dispensed and some means of indicating the discharge of liquid from the apparatus. Many flow indicators have been designed and used with meter type pumps but none of them have been entirely satisfactory commercially.

The principal object of my invention is to provide a visible flow indicator, which may be used on any type of liquid dispensing apparatus and one which will enable the customer purchasing gasoline to not only see the quality of the liquid being delivered to his car, but will permit him to definitely ascertain whether or not the apparatus is delivering the quantity being purchased.

Another object of my invention is to provide a visible flow indicator that can be inexpensively manufactured and installed on any type of dispensing apparatus and yet function perfectly.

In the particular embodiment of my invention selected for illustration:

Figure 2 is a section on the line 2—2 of Figure 1.

Figure 1:
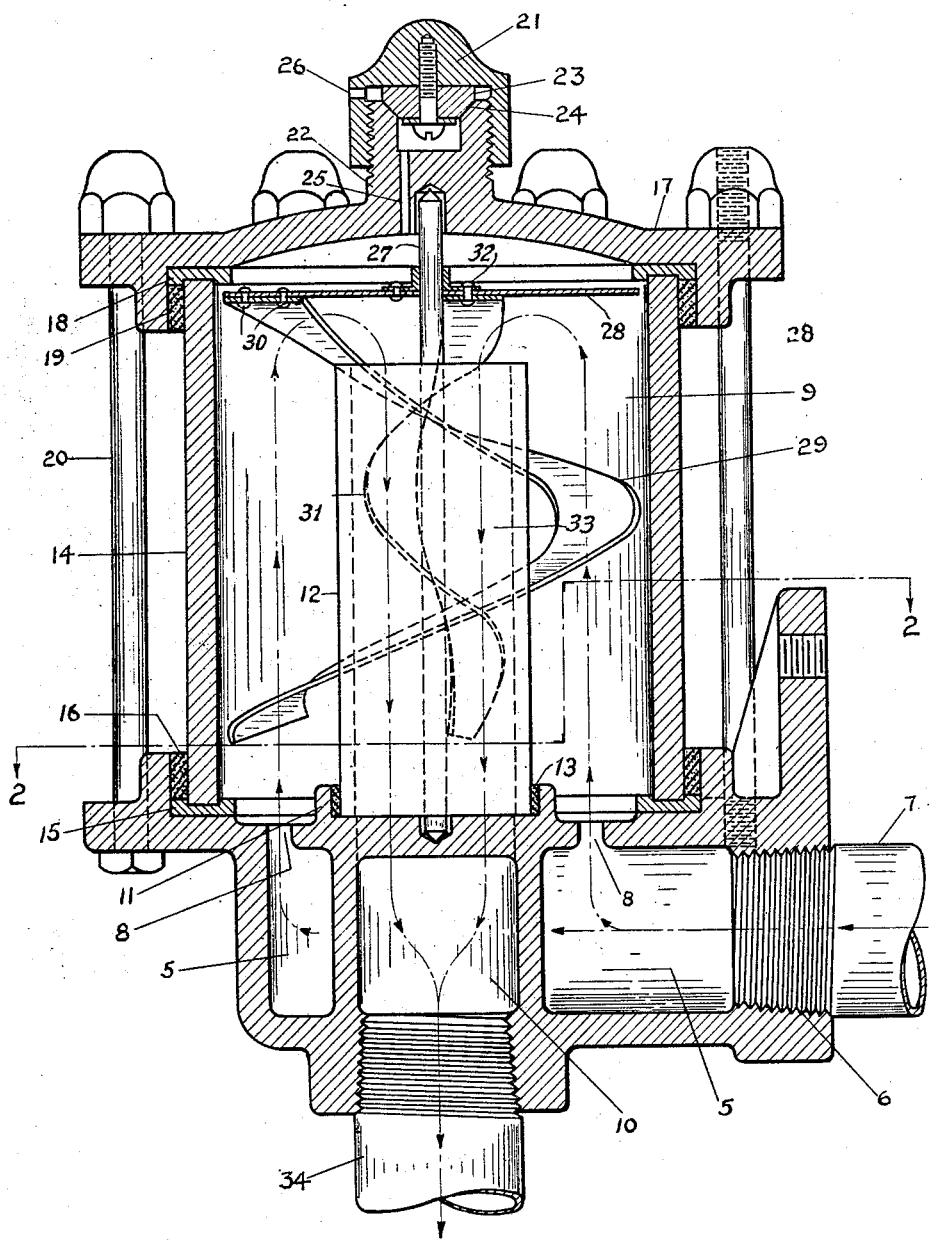
Figure 1 is a sectional elevation of one of my visible flow indicators.

Figure 3, a detail, is an elevation of the movable indicating means, and

Figure 4 is a bottom plan view of the indicating means shown in Figure 3.

Referring now to the drawings, the device has an inlet chamber (5) threaded at (6) to receive the inlet pipe (7). An annular passage (8) is provided for the conduction of liquid from the inlet chamber (5) into the visible chamber (9). Above the outlet chamber (10) is placed on a flanged member (11) an open ended transparent cylinder (12) which is sealed to its seat by means of litharge and glycerine (13) or any other suitable adhesive substance. An outer transparent member (14) seats on a gasket (15) placed in the lower part of the device and is sealed in place by any suitable adhesive substance (16). The top member (17) of the device seats upon the member (14) with a gasket (18) in between the two and with a suitable sealing medium (19) placed around the juncture. Tie-rods (20) are provided to maintain the parts in proper position.

A vent cap (21) is screw threaded onto the boss (22) formed integrally with the top member (17). A disc (23) of any suitable material is adapted to contact with a seat (24) formed in the upper part of the boss (22). An air passage way (25) is formed in the boss (22) to release air from the inside of the device so that it may be vented out through the passage (26) in the cap (21) when it is unscrewed sufficiently to remove the disc (23) from its seat (24).

A vertical shaft (27) is journaled at its upper end in the member (17) and at its lower end in the lower portion of the device. A metal plate (28) is rigidly secured to the shaft (27) for rotation therewith. A metal spiral (29) is rigidly secured to the plate (28) by means of rivets (30) or in any other suitable manner and is adapted to revolve within the chamber (9).

Another metal spiral (31) is rigidly secured to the plate (28) by means of rivets (32) and is adapted to revolve within the outlet chamber (33).

Liquid flows into the device through the pipe (7), inlet chamber (5), passage (8) and into the chamber (9). When the liquid contacts with the spiral (29) it causes it to rotate and indicate the passage of liquid upwardly through the chamber (9), where it flows into the outlet chamber (33). The liquid flows downwardly through the chamber (33), moves the spiral (31) indicating the downward course of travel. The liquid then flows out through the chamber (10) and discharge pipe (34) to any suitable receptacle. The purchaser can readily see the flow of liquid through the device, both into and out of it, and consequently is certain the fluid is being properly dispensed without any possibility of its being diverted to any undesired point.

While the invention has been described above in its preferred form, it will be obvious that various changes and modifications can be made therein without departing from the spirit or scope thereof and it is therefore desired that only such limitations be imposed thereon as are necessitated by the prior art or specifically set forth in the claims.

I claim:

1. A liquid flow indicator comprising a casing, a transparent cylindrical side wall, a chamber within the chamber formed by said transparent side wall, means for indicating the flow of liquid into the larger chamber and means for indicating the flow of liquid out of the inner chamber.

2. A liquid flow indicator comprising a casing, a transparent cylindrical side wall, a chamber within the chamber formed by said transparent side wall, movable means for indicating the flow of liquid into the larger chamber and movable means for indicating the flow of liquid out of the inner chamber.

3. A liquid flow indicator comprising a casing, a transparent cylindrical side wall forming a chamber within said indicator, an open ended cylindrical member within said chamber, a rotatable indicator adapted to revolve within said first mentioned chamber and a second rotatable indicator adapted to revolve within said open ended cylinder.

4. A liquid flow indicator comprising a bottom member, a top member, a transparent cylindrical wall between said bottom and top members, said members forming within them a liquid chamber, an inlet into said bottom member, a fluid passage from said inlet into the liquid chamber, an outlet in said bottom member, an open ended cylinder seated upon said bottom member and fluidly connected with said outlet, means for venting said liquid chamber, means for indicating the flow of liquid into said liquid chamber and means for indicating the flow of liquid out through said open ended cylinder.

5. A liquid flow indicator comprising a bottom member, a top member, a transparent cylindrical wall between said bottom and top members, said members forming within them a liquid chamber, an inlet into said bottom member, a fluid passage from said inlet into the liquid chamber, an outlet in said bottom member, an open ended cylinder seated upon said bottom member and fluidly connected with said outlet, a rotatable spiral member indicating the flow of liquid into said liquid chamber and a rotatable spiral member for indicating the flow of liquid out through said open ended cylinder.

6. A liquid flow indicator comprising a bottom member, a top member, a transparent cylindrical wall between said bottom and top members, said members forming within them a liquid chamber, an inlet into said bottom member, a fluid passage from said inlet into the liquid chamber, an outlet in said bottom member, an open ended cylinder seated upon said bottom member and fluidly connected with said outlet, a rotatable spiral member indicating the flow of liquid into said liquid chamber and a rotatable spiral member for indicating the flow of liquid out through said open ended cylinder, both said spiral members adapted to rotate simultaneously.

7. A liquid flow indicator comprising a casing, a transparent cylindrical side wall, a chamber within the chamber formed by said transparent side wall, a rotatable spiral member for indicating the flow of liquid into the larger chamber and a rotatable spiral member for indicating the flow of liquid out of the inner chamber.

8. A liquid flow indicator comprising a casing, a transparent cylindrical side wall, a chamber within the chamber formed by said transparent side wall, a rotatable spiral member for indicating the flow of liquid into the larger chamber and a rotatable spiral member for indicating the flow of liquid out of the inner chamber, both said spiral members adapted to rotate simultaneously.

9. A liquid flow indicator comprising a bottom member, a top member, a transparent cylindrical wall between said bottom and top members, said members forming within them a liquid chamber, means permitting the flow of liquid into said chamber, means permitting the flow of liquid out of said chamber, a shaft journaled at one end in said top member and at its other end in said bottom member, a plate rigidly secured to said shaft for rotation therewith, and spiral members secured to said plate indicating the flow of liquid into and out of said indicator.

10. A liquid flow indicator comprising a casing, a transparent cylindrical side wall, a chamber within the chamber formed by the transparent side wall, movable means for indicating the flow of liquid upwardly into the larger chamber and movable means for indicating the flow of liquid downwardly out of the inner chamber.

11. A liquid flow indicator comprising a casing, a transparent cylindrical side wall, a chamber within the chamber formed by the transparent side wall, a helical flow indicator rotatable in the chamber formed by the side wall and another helical indicator rotatable in the inner chamber.

12. A liquid flow indicator comprising a casing, a transparent cylindrical side wall, a chamber within the chamber formed by the transparent side wall, a helical flow indicator rotatable in the chamber formed by the side wall, another helical indicator rotatable in the inner chamber, both said helical indicators rotatable simultaneously.

13. A liquid flow indicator comprising a casing, a transparent cylindrical side wall, a chamber within the chamber formed by the transparent side wall, a shaft journaled in said indicator, a plate rigidly secured to said shaft, a member rigidly secured to said plate and extending into said chamber formed by the cylindrical side wall and adapted to rotate therein and another member rigidly secured to said plate and extending into the inner chamber and adapted to rotate therein.

14. A liquid flow indicator comprising a casing, a transparent cylindrical side wall, a chamber within the chamber formed by the transparent side wall, a shaft journaled in said indicator, a plate rigidly secured to said shaft, a helical flow indicator rigidly secured to said plate and extending into said chamber formed by the cylindrical side wall and adapted to rotate therein and another helical flow indicator rigidly secured to said plate and extending into the inner chamber and adapted to rotate therein.

In testimony whereof I have hereunto set my hand.

NATHANIEL D. HULL.